UNITED STATES PATENT OFFICE.

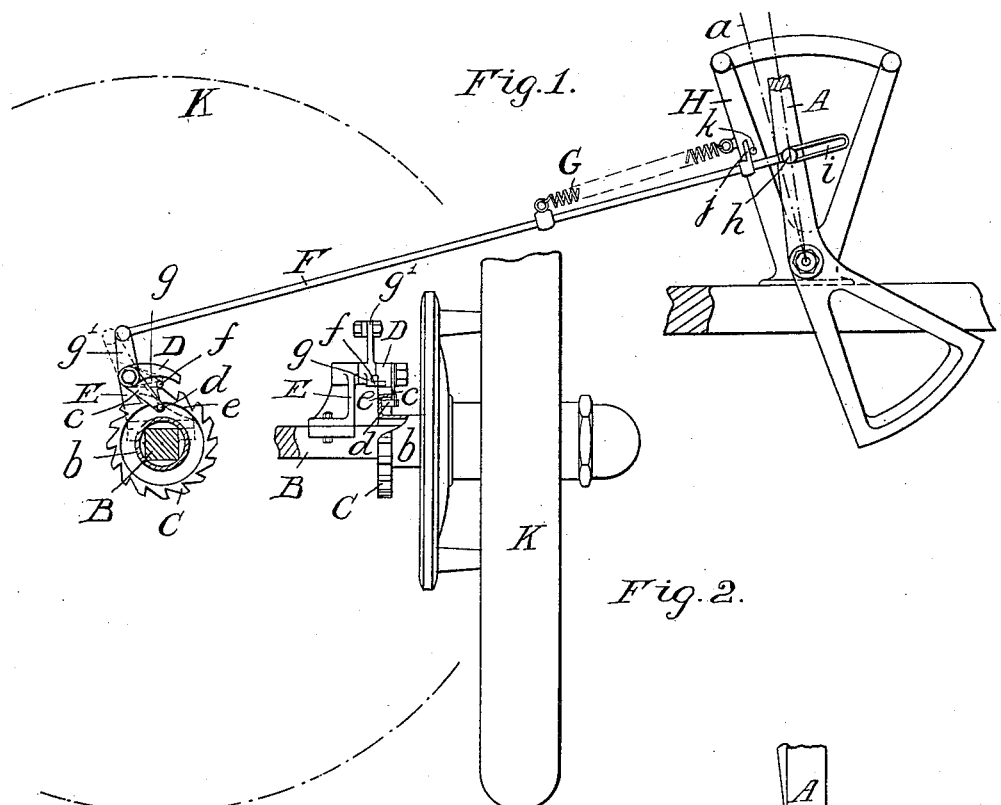
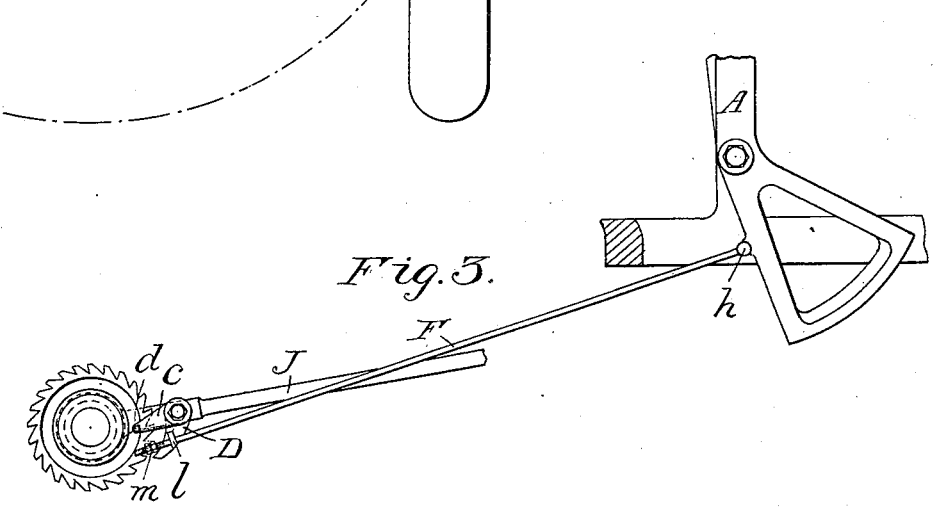

HERBERT AUSTIN, OF ERDINGTON, ENGLAND.

MOTOR-CAR.

SPECIFICATION forming part of Letters Patent No. 698,890, dated April 29, 1902.

Application filed February 19, 1902. Serial No. 94,774. (No model.)

*To all whom it may concern:*

Be it known that I, HERBERT AUSTIN, engineer, a subject of the King of Great Britain, residing at Erdington, near Birmingham, England, have invented certain new and useful Improvements in Back Pawl Devices for Motor-Vehicles, of which the following is a specification.

When it is desired to run a motor vehicle or car backward, the pawl of the ratchet-and-pawl device used for preventing the car from accidentally running back needs, of course, to be raised or held so that it cannot engage with the ratchet-wheel, and this has been effected heretofore by means which are independent of these by which the car is reversed, with the result that the dropping or releasing of the pawl may be overlooked and the safety device thus remain out of action.

Now this invention has for its object to insure that when the pawl has been raised or held out of gear for backward running of the car the reversing of the car to run it in a forward direction will automatically cause the dropping or releasing of the pawl, so that it will engage with the ratchet-wheel should the car begin to run back, and this object is effected through the medium of parts which are connected with the reversing mechanism in such manner that as the reversing-handle is moved from its zero position in a direction to run the car backward the pawl is raised or held out of engagement with the ratchet, and that as the lever is moved in the opposite direction back to its zero position to stop the car or beyond its zero position to run the car in a forward direction the pawl will be allowed to fall again or be released.

The invention is obviously capable of considerable modification in detail; but to enable it to be fully understood and readily carried out I will now describe (by way of example) two practical applications of the same, which are illustrated by the drawings herewith.

Figure 1 is a side elevation of one of these applications; Fig. 2, a rear view of the mechanism shown at the left hand in Fig. 1, the ratchet-wheel being in section; and Fig. 3, a side elevation of the other application.

Referring first to the application shown by Figs. 1 and 2, A is the reversing-lever, which is shown in its zero position. The lever is moved into the position indicated by the radial line $a$ to reverse the car and may be moved in the opposite direction from its position shown into any one of several positions for forward running, according to the speed at which it is desired to run the car, as is usual and as will be readily understood. The driven road-wheels (of which one of them, K, is shown) are mounted, as is usual, upon a fixed axle B. C is the usual ratchet-wheel, the hub $b$ of which is fixed, as is usual, to one of the driven road-wheels. A pawl D is pivoted to a bracket E, which is fixed to the axle B. This pawl is of the usual character and is capable of engaging with the ratchet-wheel C to prevent the car running backward. A spring-arm $c$ of the usual character is fixed to the boss of the pawl D, and the outer or free end of this arm passes partially across one side of the ratchet-wheel C and carries the usual wiper $d$, which it presses against the side of the wheel to insure that when the car is running forward the spring-arm will be moved up as far as the rim $e$ of such wheel will allow, and thus hold the pawl clear of the teeth of the ratchet-wheel and prevent it clicking over the teeth, and to insure that if the car commences to run backward the pawl will be moved in and engage with the teeth of the ratchet, and thus prevent the car running farther backward. The mechanism thus far described is substantially the same as that commonly in use for the purpose. Now to avoid any risk that the ratchet mechanism may be left in a condition which renders it inoperative in case the car should accidentally run backward the pawl D is held out of engagement with the teeth of the ratchet-wheel C by means of a stud $f$, projecting sidewise from the outer end of an arm $g$ of a bell-crank $g$ $g'$, which conveniently turns upon the pivot-axis of the pawl, and the upper or outer end of the arm $g'$ is connected with the reversing-lever A through the medium of the rod F, and the connection of the rod with the lever A is by means of a stud $h$ of the lever, which passes through a slot $i$ in the end of the rod. The rod F is constantly urged, by means of a spring G, fixed at one end to the rod and at the other to the reversing-quadrant H or other fixed part, in a direction tending to bring the inner end of the slot $i$ against the stud $h$ of the reversing-lever, and when the reversing-handle is in its zero position, as shown, the inner end of the slot $i$ is against the stud $h$, and the stud $f$ of the arm $g$ is sufficiently depressed to allow the pawl D to engage with the ratchet-wheel C should the car commence to run backward. If the reversing-handle is moved back from its zero position into the position indicated by line $a$, the rod F is pressed backward against the elastic force of the spring G and the bell-crank $g\ g'$ is turned backward and the stud $f$ thus brought into the upward position, (indicated by a broken-line circle,) thereby preventing the pawl from engaging with the ratchet-wheel as the car runs backward. When the reversing-lever is moved again into its zero position, the rod F is correspondingly moved forward by the spring with the inner end of the slot $i$ against the stud $h$, and the bell-crank is thus turned again into its former position, depressing the stud $f$ and allowing the pawl D to engage with the ratchet-wheel C should the car accidentally commence to run back. A projection $j$ of the rod F coming against a stud $k$ of the reversing-quadrant H prevents the rod F from being moved farther forward than its position shown by Fig. 1—that is to say, with the inner end of the slot $i$ against the stud $h$ when the lever A is in its zero position—and therefore as the lever A is moved forward into either of its positions for the forward running of the car the stud $h$ thereof simply moves along the slot $i$. As the lever is moved back again from either of its forward positions to its zero position the stud $h$ thereof simply moves along the slot $i$. The spring $c$ and wiper $d$ may of course be dispensed with, if desired, in which case, however, the ratchet-pawl would click over the teeth of the ratchet-wheel during the forward running of the car and the pawl would be lifted by the stud $f$ of the bell-crank to clear it from the ratchet-teeth. The slot $i$ in the rod G, which provides lost motion, is not absolutely essential; but if it were omitted and the stud $h$ engaged a plain hole in the rod a very unnecessary and indeed inconvenient extent of movement would be imparted to the bell-crank $g\ g'$.

According to the application of the invention shown by Fig. 3 the pivot-axis of the pawl D is shown as carried by the radius-bar J, which is used to keep the rear axle properly distanced from the shaft which drives it. The rod F in this case is pivoted to the portion of the reversing-lever which is below the pivot-axis thereof by means of a pin $h$ passing through a plain eye of the rod, and the other end of the rod passes loosely through a lug $l$, which projects at the side of the pawl D, and lock-nuts $m$ are screwed onto the outer end of the rod. When the lever A is in its zero position, the inner of the lock-nuts $m$ is sufficiently back from the lug $l$ of the pawl to enable the pawl to be moved into engagement with the ratchet-wheel C if the car commences to run back, and as the lever A is moved into any position for the forward running of the car the distance between the inner nut $m$ and the lug $l$ is increased, and therefore of course the pawl may still be brought into engagement with the ratchet-wheel should the car commence to run backward. If, however, the lever A is moved into its position for reversing the car, the inner nut $m$ will be brought up against the lug $l$ and the pawl thus be prevented from engaging with the ratchet-wheel C. The pawl D is shown in this case to be moved by a wiper $d$ and spring-arm $c$; but such wiper and arm may of course be dispensed with if the pawl is pressed toward the ratchet by a spring, though in such case the pawl will click over the ratchet-teeth during the forward running of the car.

Having fully described my invention, what I claim, and desire to secure by Letters Patent, is—

1. The combination with the pawl-and-ratchet device, and the starting and reversing mechanism of a motor vehicle or car, of a device controlling the engagement and disengagement of the pawl with the ratchet-wheel, and means connecting said controlling device with the lever of said reversing mechanism, and operating to prevent the pawl from engaging when the mechanism is reversed for backing and to permit it to engage when the mechanism is set for stopping or for forward running.

2. The combination with the pawl-and-ratchet device, and the starting and reversing lever of a motor vehicle or car, of a lever mounted adjacent to the pawl and having means for controlling the position and movements of said pawl, and a rod connecting one arm of said lever with the reversing-lever, whereby the movements of said reversing-lever serve to control the pawl.

3. In a motor vehicle or car, the combination with a part of the starting and reversing mechanism which is moved in one direction from the zero position for reversing and in the other direction for forward running, and the pawl-and-ratchet device to prevent inadvertent running backward, of a movable device adjacent to the pawl to control the position and movements of the latter, connecting means between said device and the movable part of the reversing mechanism, and slidably connected with the latter to provide lost motion, and a spring operating in conjunction with said connecting means and tending to permit the pawl to engage, said spring also assuring operative connection of the parts when the driving mechanism is reversed.

4. In a motor vehicle or car, the combination with a pawl-and-ratchet device to prevent running backward, of a movable device controlling the position and movement of the pawl, the reversing-lever, a rod coupled at one end to the movable controlling device and having a slotted connection with the reversing-lever, a stop to limit the endwise movement of the rod when the lever is set for forward running, and a spring tending normally to keep the rod up to said limiting-stop.

In witness whereof I have hereunto signed my name, this 7th day of February, 1902, in the presence of two subscribing witnesses.

HERBERT AUSTIN.

Witnesses:
 THOMAS MARSTON,
 ROBERT G. GROVES.